July 13, 1965  F. WINKLER ETAL  3,194,714
FILM SPLICERS
Filed Oct. 8, 1962  2 Sheets-Sheet 1
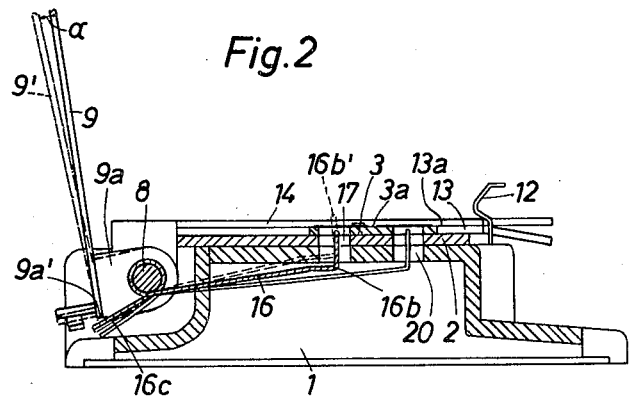
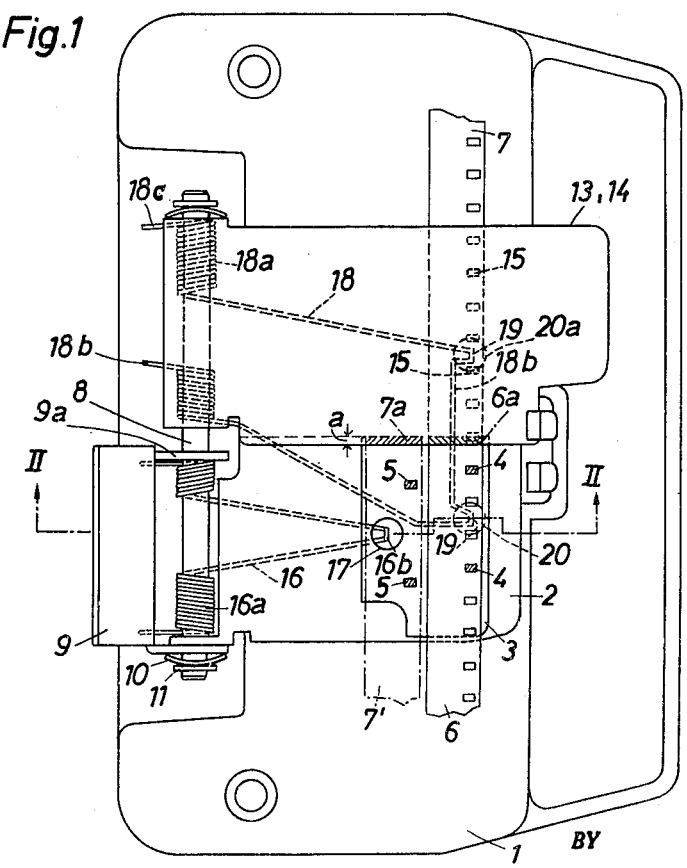
INVENTOR.
FRIEDRICH WINKLER
JOHANN ZANNER
BY
Michael S. Striker
ATT.

July 13, 1965 F. WINKLER ETAL 3,194,714
FILM SPLICERS
Filed Oct. 8, 1962 2 Sheets-Sheet 2

INVENTOR.
FRIEDRICH WINKLER
JOHANN ZANNER
BY
Michael J. Striker

United States Patent Office 3,194,714
Patented July 13, 1965

3,194,714
FILM SPLICERS
Friedrich Winkler, Munich, and Johann Zanner, Unterhaching, near Munich, Germany, assignors to Agfa, Aktiengesellschaft, Leverkusen-Bayerwerk, Germany
Filed Oct. 8, 1962, Ser. No. 228,824
Claims priority, application Germany, Oct. 14, 1961,
A 38,560
15 Claims. (Cl. 156—502)

The present invention relates to film splicers.

As is well known, when it is desired to join together the ends of a pair of film strips, they are first cut at their ends which are to be joined to each other and then with the use of a suitable cement joined to each other at their previously cut ends. Certain known film splicers are provided with special devices which serve to release the film from the surface of the splicer on which it is placed during the operations which are performed on the film in connection with the splicing thereof. These known devices for releasing the film from the surface of the splicer are relatively complex and in general require a separate special operation since they form entirely separate mechanisms which must be separately actuated, so that not only is the construction of the film splicer rendered more costly and more complex because of the structure which is used for releasing the film from the surface of the splicer, but in addition extra time is consumed because of the extra operation necessary in connection with the release of the film from the surface of the splicer, and of course the entire operation of the splicer is rendered more complex because the operator must know how to actuate the structure for releasing the film from the surface of the splicer.

It is accordingly a primary object of the present invention to provide a film splicer of the above type which is capable for releasing film from the surface of the splicer but which does not require any complicated structure for this purpose and which does not require the operator to perform any extra, time-consuming operation for the purpose of releasing the film from the splicer.

Another object of the present invention is to provide a film splicer of the above type with a structure capable of releasing film from the splicer not only at the very end of the splicing operations but also at the end of the operation where the film ends are cut preparatory to joining of these film ends to each other.

A further object of the present invention is to provide a film splicer of the above type wherein the operation of the structure which releases the film from the surface of the splicer takes place in practically a fully automatic manner during performance of other necessary operations which are used in connection with the operation of the film splicer but not specifically for the purpose of releasing film from the surface thereof, so that the operator without even being conscious of the fact that a release mechanism is being operated would nevertheless operate such a mechanism to release the film from the surface of the splicer.

It is still another object of the present invention to provide a structure which is simple and inexpensive and at the same time very reliable in operation.

With the above objects in view the invention includes, in a film splicer, a support means having a surface against which film is adapted to be placed during the splicing thereof. A hold-down means is movable toward and away from this surface of the support means and has an operating position adjacent to the surface of the support means where the hold-down means holds film against the surface of the support means. A release means is provided for releasing the film from the surface of the support means, and in accordance with the present invention a means responds to movement of the hold-down means away from the surface of the support means and cooperates with the release means for actuating the latter to release the film from the surface of the support means.

The novel features which are considered as characteristic for the invention are set forth in particular in the appended claims. The invention itself, however, both as to its construction and its method of operation, together with additional objects and advantages thereof, will be best understood from the following description of specific embodiments which read in connection with the accompanying drawings, in which:

FIG. 1 is a top plan view of one possible embodiment of a film splicer according to the present invention;

FIG. 2 is a transverse sectional view of the splicer of FIG. 1 taken along line II—II of FIG. 1 in the direction of the arrows;

Figure 4:
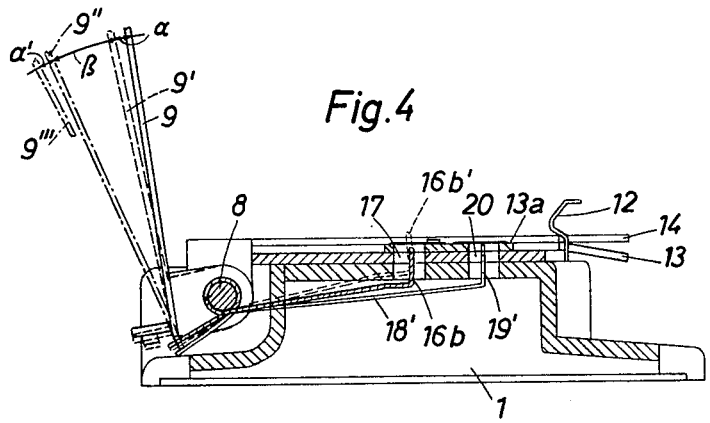
FIG. 4 is a transverse sectional view taken along line IV—IV of FIG. 3 in the direction of the arrows.

Referring now to the drawings, it will be seen that the structure includes a support means composed in part of a base frame 1 which fixedly carries at its upper surface a plate 2 which serves as a mounting plate for receiving structure located on the plate 2. Thus, a plate 3 is located on the plate 2 and is fixed thereto, and the elements 1, 2 and 3 form part of a support means with upper surface portions of the plate 3 of the support means adapted to be engaged by film strips as described below. The plate 3 fixedly carries at its upper face a pair of locating pins 4 as well as a second pair of locating pins 5, and these pins are adapted to be received in the perforations of a pair of film strips so as to determine the positions of the film strips on the plate 3 of the support means. As is illustrated in FIG. 1, a pair of film strips 6 and 7 are adapted to be spliced to each other with the illustrated splicer, and before the film strip 7 takes the position where it forms an extension of the film strip 6, this film strip 7 is placed in the position 7' indicated in dot-dash lines in FIG. 1. Thus, initially the pair of film strips 6 and 7 are both placed on a pair of surface portions of the plate 3 with the pins 4 received in a pair of perforations of the film strip 6 and the pins 5 received in a pair of perforations of the film strip 7.

The support means includes a fixed shaft 8 which may be carried by any suitable part of the support means such as the base 1 or the plate 2, and the shaft 8 serves to pivotally support a hold-down member 9 which forms part of a hold-down means for holding the film against the surface of the support means. It will be seen that the hold-down member 9 is provided with a pair of ears 9a formed with aligned apertures through which the shaft 8 extends, so that in this way the hold-down member 9 is supported for movement downwardly toward and upwardly away from the surface of the support means which receives the film strips. A spring washer 10 bears at one end against a snap ring 11 which is carried by the shaft 8 and this washer also bears against one of the ears of the hold-down member 9 to maintain this ear in engagement with a projection at the left end of the plate 2, as viewed in FIG. 1, this projection being formed with an opening through which the shaft 8 extends so that the latter is supported by the plate 2, as pointed out above, and the cooperation of the spring washer 10 with the snap ring 11 precisely locates the hold-down member 9 along the shaft 8 in a predetermined position with respect to the plate 3 which is fixedly carried by the plate 2, as pointed out above. As is shown most clearly in FIG. 2, the base frame 1 fixedly carries a leaf spring 12 which extends upwardly therefrom in the manner shown at the upper right portion of FIG. 2, and the position of this spring 12 is such that when the hold-down member 9 is turned down against the film on the plate 3 the free edge of the member 9 will engage the spring 12 and snap behind the projecting portion thereof so that the spring 12 forms a means for releasably holding the hold-down member 9 in its operating position where it is closely adjacent to the surface of the support means against which the film is located.

The shaft 8 also serves to pivotally support a pair of plates 13 and 14, the plate 13 being also a plate which is adapted to receive film thereon, and this plate 13 is usually located on top of the plate 2 and in this position it is beside the plate 3 and the plate 13 has an upper surface which is in the same plane as the plate 3 when the plate 13 is located against the plate 2. A second hold-down member 14, which forms the hold-down means with the hold-down member 9, is also pivotally carried by the shaft 8 and cooperates with the plate 13 for holding film thereon in the same way that the plate 9 cooperates with the plate 3. A second spring 12 cooperates with the plate 14 to releasably hold it in its operating position adjacent to the plate 13, as described below.

When the plate 9 is turned down to its lower position and the pair of film strips 6 and 7 have been initially placed on the plate 3 with the film strip 6 in the position shown in solid lines and the film strip 7 in the position 7' of FIG. 1, the free ends of the films 6 and 7 projecting beyond the plate 3 can be cut by turning down plate 13. Then the end portions 6a and 7a of the film strips projecting by a distance $a$ beyond plate 9 can be scraped in known manner by scraper means in a bevelled or stepped configuration.

After the ends of the film strips which project beyond the plate 9 have been cut in this way, the plate 9 is returned to its rest position, moving away from the support means at this time, and the film strip 7 is removed from the plate 3 and placed on the plate 13, this latter plate having a pair of pins 15 which enter into a pair of perforations of the film strip 7 for locating the latter precisely along a surface portion of the plate 13 which forms an extension of that surface portion of the plate 3 which receives the film strip 6, so that in this way the film strips 6 and 7 will be aligned with each other with their ends 6a and 7a engaging each other. The plate 13 also forms part of the support means and it is provided with a surface portion which receives the film strip 7 after the end 7a thereof has been cut in the manner described above. Before the film strip 7 is placed in its position on the plate 13 of the support means, a suitable film cement has been applied to the cut ends 6a and 7a so that when these ends are placed in engagement with each other the pair of film strips will be bonded to each other. Once the film strip 7 has been placed in the above-described manner on the plate 13, the second hold-down plate 14 is turned down to its operating position where it is closely adjacent to the plate 13 pressing the film 7 downwardly against the same, in the same way that the plate 9 presses the film strip 6 down against the plate 3, and the parts remain in this position until the cement dries so as to form a secure bond between the pair of film strips. Thereafter the pair of hold-down members 9 and 14, which form the hold-down means, are turned upwardly away from the support means so that the spliced film 6, 7 can be removed from the splicer.

A release means is provided for releasing the film strip 7, when it is in the position 7', from the surface of the plate 3 so that the film strip can then be placed on the surface portion of the plate 13 of the support means. This release means takes the form of an elongated lever 16 which is pivotally supported by the shaft 8. In the illustrated example the lever 16 is springy and is in the form of an elongated wire spring having an intermediate portion 16a coiled about the shaft 18, the right end of the lever 16, as viewed in FIGS. 1 and 2, being directed upwardly so as to provide the lever 16 at its end 16b with a substantially hook-shaped configuration, as shown most clearly in FIG. 2. As is apparent from FIG. 2, the plates 2 and 3 as well as the upper wall of the frame 1 are respectively formed with aligned openings which cooperate to form an opening 17 of the support means into which the end 16b of the lever 16 extends, and it will be noted that the tip of the end 16b is adjacent to the surface portion 3a of the plate 3 on which the film strip 7 is located when it is in the position 7'. The release lever 16 is provided with a free end portion 16c distant from its end 16b, and the free ends 16c of the springy lever 16 are located in the path of movement of the edge 9a' of the hold-down member 9 when the latter is turned away from the support means. The edge 9a' of the hold-down member 9 forms a means which responds to movement of the hold-down means away from the support means for actuating the release means 16 so that it will release the film from the surface of the support means. Thus, when the hold-down member 9 is turned away from the support means to the solid line position indicated in FIG. 2 the edge 9a' will just come into engagement with the free end portion 16c of the lever 16. When the operator turns the member 9 through the additional angular distance $\alpha$ to the broken line position 9' indicated in FIG. 2, then the edge 9a' by engaging and moving the free end portion 16c of the lever 16 turns the latter so that its end 16b moves to the position 16b' indicated in FIG. 2, with the result that the tip of the end 16b of the lever 16 moves through the opening 17 and above the surface portion 3a which receives the film 7 when it is in the position 7', so that in this way the lever 16 releases the film from the surface portion 3a of the plate 3, raising the film away from the pins 5 so that the operator can now very easily place the film in the above-described location on the plate 13. It will be seen, therefore, that with the structure of the invention the movement of the plate 9 away from the film, an operation which must be performed in any event even if there were no release means, produces automatically, by the simple additional turning of the member 9 through the angle $\alpha$ actuation of the release means to release the film, and thus there is practically no additional time and no extra operation required for this purpose with the structure of the invention.

The release means of the invention includes a second release lever 18 which is also springy and in the form of an elongated wire spring having an intermediate portion 18a coiled about the shaft 8 in the same way that the intermediate portion 16a of the lever 16 is coiled about the shaft 8. The portions 18a of the lever 18 are located on the shaft 8 in the region of the plates 13 and 14. At its right end, as viewed in FIGS. 1 and 2, the lever 18 is provided with substantially hook-shaped portions 19 which respectively extend into openings 20 and 20a formed in the plates 2, 3 and 2, 13, as well as in the upper wall of the frame 1, so that one set of aligned openings forms the opening 20a. Distant from the ends 19 of the lever 18, this lever 18 has a free end portion 18b formed by the free ends of the wire spring and located in the path of movement of the rear edge of the plate 14 so that when the hold-down member 14 is turned away from the support means its rear edge will engage and move the free end portion 18b of the lever 18 so as to turn the portions 19 thereof upwardly to an elevation beyond the upper surface portions of the plates 3 and 13 so as to release the spliced film 6, 7 from the surface of the support means, the film being raised away from the pins 4 and 15 so that the operator can conveniently remove the spliced film from the splicer. In this case also the plate 14 when turned away from the support means will first engage the ends 18b of the lever 18 and then when turned through the slight additional angle $\alpha$ will actuate the lever 18 so as to release the film from the surface of the support means.

Figure 3:
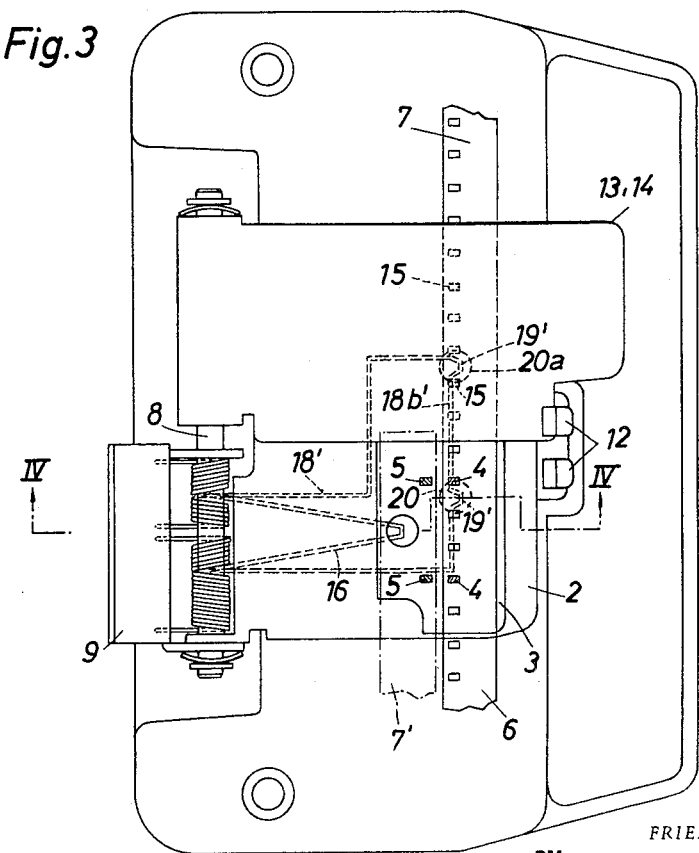
FIG. 3 is a top plan view of another embodiment of a film splicer according to the present invention.

The embodiment of the invention which is illustrated in FIGS. 3 and 4 differs from that of FIGS. 1 and 2 only in that the second release lever 18 is replaced by a lever 18' which is mounted on the same portion of the shaft 8 as the lever 16 and which is also actuated by the hold-down member 9. The lever 16 is actuated in the same way as described above in connection with FIGS. 1 and 2 by turning of the plate 9 away from the support means through the additional angle α, as described above, until the plate 9 reaches the position 9'.

Referring to FIG. 4, the turning of the plate 9 in this embodiment through the additional angle β from the position 9' up to the position 9" brings the edge 9a' of the hold-down member 9 into engagement with the free end portion of the lever 18', and then when the plate 9 is turned through the slight additional angle α' the lever 18' is actuated to release the film from the plates 3 and 13. It will be noted that the lever 18' has the configuration shown in FIG. 3 where it is also provided with a pair of substantially hook-shaped portions 19' extending into the openings 20 and 20a. As is apparent from FIG. 4, when the lever 16 is actuated during the initial turning of the plate 9 to the position 9', the lever 16 is placed in engagement with the underside of the upper wall of the frame 1, and it is only by further stressing of the spring 16 that the operator turns the plate 9 to the position 9", but because of its springy construction the lever 16 yields during the further turning of the hold-down member 9 in order to actuate the release lever 18'. The plate 9 is moved by the operator into the position 9'" only when it is required to remove the spliced film strip 6, 7 from the splicer. At the first stage when it is only necessary to remove the film 7 from the position 7', the plate 9 is moved only to the position 9'.

The surfaces on which the film is placed are freely visible to the operator so that the operator will immediately notice if any of the ends of the release levers project above the surfaces on which the film is to be placed, so that with the structure of the invention it cannot happen that a film will be placed on a surface while a release lever is in a position with its ends projecting above this surface. Of course, whenever the hold-down members 9 and 14 are released by the operator they will be in positions where they do not position the right ends of the release levers above the surfaces which receive the film. The hold-down members 9 and 14 can be provided with openings having a snug friction fit with the shaft 8 so that the operator can place these hold-down members in positions where they will be retained by friction at such angular locations that they do not maintain the release levers in positions where their right ends, as viewed in the drawings, project above the surfaces which receive the film. It is also possible to provide for the left free end portions of the levers 16 and 18 stops formed, for example, by an edge portion of the frame 1, and engaged by the left free ends of the levers so as to position them in locations where their right ends do not project above the surfaces which receive the film. The free end portions of the springy levers would be elongated for this purpose so that they would be flexed and bent during actuation of the release levers by the hold-down members 9 and 14, and with this construction the springy free end portions of the levers would themselves act to position the hold-down members in rest positions where they do not cause the right free ends of the levers 16 and 18 to project above the surfaces which receive the film.

It is also possible to provide an arrangement where the release levers cooperate with the pins 4, 5 and 15 to withdraw these pins downwardly from the surfaces which receive the film so as to release the film in this way, and with such a construction the pins 4, 5 and 15 can either be fixedly connected with the release levers or can have surface portions engaged by portions of the levers during actuation thereof by the hold-down means so as to withdraw the pins downwardly from the surfaces on which the film is located so as to release the film in this way also. Once the locating pins are removed in this way the film will, due to the inherent tendency of the film to curl, automatically raise itself away from the surface of the support means.

It will be understood that each of the elements described above, or two or more together, may also find a useful application in other types of splicers differing from the types described above.

While the invention has been illustrated and described as embodied in splicers with film ejectors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a film splicer, in combination, support means having a surface adapted to be engaged by film during splicing thereof; hold-down means movable toward and away from said surface for holding film against said surface when said hold-down means is in an operating position adjacent said surface; release means located adjacent said support means for releasing film from said surface thereof; and means responsive to movement of said holding down means away from said surface and cooperating with said release means for actuating the latter to release film from said surface when said hold-down means is moved away from said surface.

2. In a film splicer, in combination, support means having a surface adapted to be engaged by film during splicing thereof; hold-down means movable toward and away from said surface for holding film against said surface when said hold-down means is in an operating position adjacent said surface; release means located adjacent said support means for releasing film from said surface thereof; and means responsive to movement of said hold-down means away from said surface and cooperating with said release means for actuating the latter to release film said surface when said hold-down means is moved away from said surface, said means for actuating said release means in response to movement of said hold-down means from said surface including a portion of said hold-down means and a portion of said release means which is located in the path of movement of said portion of said hold-down means when the latter is moved away from said surface and which is engaged and moved by said portion of said hold-down means when the latter is moved through a given distance away from said surface.

3. In a film splicer, in combination, support means having a surface adapted to be engaged by film during splicing thereof and formed with an opening located at part of said surface; hold-down means movable toward and away from said surface for holding film on said surface when said hold-down means is in an operating position adjacent said surface; release lever means pivotally carried by said support means and having an ejecting portion extending through said opening to engage film on said surface and raise the film away from said surface when said lever means is turned in a given direction, said lever means having a free end portion distant from said opening, and said hold-down means having a portion which engages said free end portion of said lever means and turns the latter during movement of said hold-down means away from said surface so that film is released from said surface in response to movement of said hold-down means away from said surface.

4. In a film splicer, in combination, support means having a surface adapted to be engaged by film during splicing thereof; hold-down means movable toward and away from said surface for holding film against said surface when said hold-down means is in an operating position adjacent said surface; springy release lever means turnably carried by said support means and having a film-engaging portion which engages the film and releases the latter from said surface when said lever means is turned in a given direction, said springy release lever means having a free end portion distant from said film-engaging portion thereof and located in the path of movement of a portion of said hold-down means when the latter is moved away from said surface to be engaged and moved by said portion of said hold-down means which thus actuates said lever means to release film from said surface.

5. In a film splicer, in combination, support means having a surface adapted to be engaged by film during splicing thereof; hold-down means movable toward and away from said surface and having an operating position adjacent said surface holding film against said surface; a stationary shaft carried by said support means; an elongated springy lever having an intermediate portion coiled around said shaft, having on one side of said intermediate portion a film-engaging portion for engaging film and releasing the latter from said surface when said lever is turned in a given direction about said shaft, and said lever having an elongated free end portion on the opposite side of said shaft, said hold-down means having a portion which engages and moves said free end portion of said lever during movement of said hold-down means away from said surface to turn said lever in said given direction for releasing film from said surface, whereby the lever is actuated to release film from said surface in response to movement of said hold-down means away from said surface.

6. In a film splicer, in combination, support means having a surface adapted to be engaged by film during splicing thereof; hold-down means movable toward and away from said surface and having an operating position adjacent said surface holding film against said surface; a stationary shaft carried by said support means; an elongated springy lever having an intermediate portion coiled around said shaft, having on one side of said intermediate portion a film-engaging portion for engaging film and releasing the latter from said surface when said lever is turned in a given direction about said shaft, and said lever having an elongated free end portion on the opposite side of said shaft, said hold-down means having a portion which engages and moves said free end portion of said lever during movement of said hold-down means away from said surface to turn said lever in said given direction for releasing film from said surface, whereby the lever is actuated to release film from said surface in response to movement of said hold-down means away from said surface, said hold-down means also being pivotally supported by said shaft for movement toward and away from said surface.

7. In a film splicer, in combination, support means having a pair of elongated surface portions against which a pair of film strips are located to have their ends cut while engaging said pair of surface portions preparatory to joining of said ends of said film strips to each other, said support means having a third elongated surface portion forming an extension of one of said pair of surface portions so that the film strip at the other of said pair of surface portions after its end is cut can be removed from said other surface portion and placed on said third surface portion forming an extension of the film strip on said one of said pair of surface portions while the cut ends of the film strips are joined to each other; hold-down means movable toward and away from said surface portions for holding film strips thereon when said hold-down means is in an operating position adjacent said surface portions of said support means; a pair of release means for respectively releasing film strips from said other of said pair of surface portions and from said one of said pair of surface portions and the third surface portion which forms an extension thereof; and means responsive to movement of said hold-down means away from said surface portions and cooperating with said pair of release means for actuating the latter to release film from said surface portions.

8. In a film splicer as recited in claim 7, said hold-down means including a pair of hold-down members one of which holds a film strip on the other of said pair of surface portions during cutting of the end thereof and the other of said hold-down members holding the latter film strip on said third surface portion, said one hold-down member actuating the release means which cooperates with the film at the other of said pair of surface portions and said other hold-down member cooperating with the release means which releases film from said third and said one of said pair of surface portions.

9. In a film splicer as recited in claim 7, said hold-down means including a pair of hold-down members one of which holds a film strip on the other of said pair of surface portions during the cutting of the ends of the film strips and the other of said hold-down members holding a film strip on said third surface portion after its end has been cut while located at said other of said pair of surface portions, and said one of said pair of hold-down members during movement away from said surface portions actuating first the release means which releases film from said other of said pair of surface portions and then the release means which releases film from said third and said one of said pair of surface portions.

10. In a film splicer, in combination, support means having a surface which is adapted to support film during splicing thereof and formed with an opening located at said surface; an elongated release lever pivotally carried by said support means and having a free end extending into said opening and adapted to project above said surface of said support means when said release lever is turned in a given direction, said release lever having a free end portion distant from said opening; and a hold-down member also pivotally carried by said support means for turning movement toward and away from said surface thereof for holding film against said surface when said hold-down member is adjacent said surface, said hold-down member having a free end portion which engages said free end portion of said lever to turn the latter in a direction which releases film from said surface when said hold-down member is turned away from said surface.

11. In a film splicer, in combination, support means having a surface which is adapted to support film during splicing thereof and formed with an opening located at said surface; an elongated release lever pivotally carried by said support means and having a free end extending into said opening and adapted to project above said surface of said support means when said release lever is turned in a given direction, said release lever having a free end portion distant from said opening; and a hold-down member also pivotally carried by said support means for turning movement toward and away from said surface thereof for holding film against said surface when said hold-down member is adjacent said surface, said hold-down member having a free end portion which engages said free end portion of said lever to turn the latter in a direction which releases film from said surface when said hold-down member is turned away from said surface, said hold-down member being supported by said support means for turning movement about the same axis as said lever.

12. In a film splicer, in combination, support means having a surface which is adapted to support film during splicing thereof and formed with an opening located at said surface; an elongated release lever pivotally carried by said support means and having a free end extending into said opening and adapted to project above said surface of said support means when said release lever is turned in a given direction, said release lever having a free end portion distant from said opening; and a hold-down member also pivotally carried by said support means for turning movement toward and away from said surface thereof for holding film against said surface when said hold-down member is adjacent said surface, said hold-down member having a free end portion which engages said free end portion of said lever to turn the latter in a direction which releases film from said surface when said hold-down member is turned away from said surface, said lever being in the form of an elongated wire spring having portions coiled about the part of said support means which supports said lever for turning movement.

13. In a film splicer, in combination, support means having a pair of surface portions against which a pair of film strips are adapted to be located during cutting of the ends thereof preparatory to joining of said film strips to each other at said ends, said support means having a third surface portion forming an extension to one of said pair of surface portions and to which the film strip at the other of said pair of surface portions is moved after the ends of the film strips have been cut so that the ends of the film strips will be joined to each other when the film strips occupy, respectively, said third surface portion and said one of said pair of surface portions, said support means being formed with three openings respectively located at said surface portions thereof, and said support means including an elongated stationary shaft; a first release lever turnably carried by said shaft and having a film-engaging portion extending into the opening of said support means which is located at the other of said pair of said surface portions, said first release lever having a free end portion distant from said film-engaging portion thereof; a second release lever turnably carried by said shaft and having a pair of film-engaging portions respectively extending into the openings of said support means which are respectively located at said third surface portion and at said one of said pair of surface portions thereof, said second lever also having a free end portion distant from said film-engaging portions thereof; and hold-down means movable toward and away from said surface of said support means for holding film against said support means when said hold-down means is in an operating position adjacent to said surface portions of said support means, said hold-down means when moving away from said surface portions of said support means engaging said free ends of said levers for turning the latter to move said film-engaging portions thereof through said openings, respectively, and beyond said surface portions to release film therefrom.

14. In a film splicer as recited in claim 13, said hold-down means including a pair of hold-down members which respectively engage said free end portions of said levers.

15. In a film splicer as recited in claim 13, said hold-down means including a pair of hold-down members one of which actuates said first release lever during movement through a given distance away from said support means and which engages said second lever at said free end portion thereof during further movement beyond said given distance away from said support means.

References Cited by the Examiner

FOREIGN PATENTS 426,424  4/35  Great Britain.

EARL M. BERGERT, *Primary Examiner.*